(12) United States Patent
Honda et al.

(10) Patent No.: US 7,520,833 B2
(45) Date of Patent: Apr. 21, 2009

(54) VEHICULAR DRIVING FORCE DISTRIBUTION SYSTEM

(75) Inventors: Kenji Honda, Wako (JP); Yoshihito Kurizuka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 337 days.

(21) Appl. No.: 11/481,254

(22) Filed: Jul. 6, 2006

(65) Prior Publication Data

US 2007/0021262 A1    Jan. 25, 2007

(30) Foreign Application Priority Data

Jul. 8, 2005    (JP)    ............................. 2005-200525

(51) Int. Cl.
F16H 48/20    (2006.01)
(52) U.S. Cl. .................... 475/248; 475/32; 475/207; 74/607
(58) Field of Classification Search .................. 475/18, 475/19, 22, 27, 29, 32, 116, 199, 204, 207, 475/208, 219, 248, 249, 275, 284, 288, 311, 475/313, 323, 325, 330; 74/606 R, 607
See application file for complete search history.

(56) References Cited

U.S. PATENT DOCUMENTS

| | | | | |
|---|---|---|---|---|
| 5,409,425 A | * | 4/1995 | Shibahata | ...................... 475/5 |
| 5,893,812 A | * | 4/1999 | Narai et al. | ................... 475/86 |
| 6,432,014 B2 | * | 8/2002 | Fujie et al. | .................... 475/84 |

FOREIGN PATENT DOCUMENTS

JP    7-12426 A    1/1995

* cited by examiner

*Primary Examiner*—David D. Le
(74) *Attorney, Agent, or Firm*—Westerman, Hattori, Daniels & Adrian, LLP.

(57) ABSTRACT

In a vehicular driving force distribution system, an oil pump which produces a hydraulic pressure for operating a torque distribution mechanism is driven, via gears and a rotating shaft, by the rotation of a differential case of a differential device. Therefore, regardless of the rotational condition of right and left wheels, namely, even if one of the right and left wheels stops, the oil pump is driven by the driving force of the rotating differential case, thereby reliably operating the torque distribution mechanism. Also, a pump unit for housing the oil pump is supported on a partition wall that separates the differential device from the torque distribution mechanism, thereby easily supporting the oil pump.

7 Claims, 12 Drawing Sheets

VEHICULAR DRIVING FORCE DISTRIBUTION SYSTEM

RELATED APPLICATION DATA

The Japanese priority application No. 2005-200525 upon which the present application is based is hereby incorporated in its entirety herein by reference.

BACKGROUND OF THE INVENTION

1. Field of the Invention

The present invention relates to a vehicular driving force distribution system comprising: a differential device to which torque is supplied from a driving source; and a torque distribution mechanism for distributing the torque supplied to the differential device between left and right wheels in an arbitrary ratio.

2. Description of the Related Art

Such a vehicular driving force distribution system is disclosed in Japanese Patent Application Laid-open No. 7-12426. In this vehicular driving force distribution system, an oil pump is driven by increasing the rotational speed of one of right and left axles, and a hydraulic control circuit for a torque distribution mechanism is operated by a hydraulic pressure produced by the oil pump, thereby distributing torque between right and left wheels.

In this conventional distribution device, since the rotation of one of the right and left axles is increased to drive the oil pump, a differential device sometimes functions depending on the condition of road surface, so that one of the right and left wheels races or run idle. In such a case, there is a possibility that the axle of the other wheel stops rotating and the oil pump becomes incapable of being operated.

SUMMARY OF THE INVENTION

The present invention has been achieved in view of the above-mentioned circumstances, and has an object to provide a vehicular driving force distribution system comprising a differential device and a torque distribution mechanism for distributing torque between axles of right and left wheels, wherein an oil pump for feeding working oil to the torque distribution mechanism is reliably operated.

In order to achieve the above object, according to a first feature of the present invention, there is provided a vehicular driving force distribution system comprising: a differential device to which torque is supplied from a driving source; and a torque distribution mechanism for distributing the torque supplied to the differential device between left and right wheels in an arbitrary ratio, wherein an oil pump which produces a hydraulic pressure for operating the torque distribution mechanism is driven by rotation of a differential case of the differential device.

With the arrangement of the first feature, the oil pump which produces a hydraulic pressure for operating the torque distribution mechanism is driven by the rotation of the differential case of the differential device. Therefore, regardless of the rotational condition of the right and left wheels, namely, even if one of the right and left wheels stops, the oil pump is driven by the driving force of the rotating differential case, thereby reliably operating the torque distribution mechanism.

According to a second feature of the present invention, in addition to the first feature, a pump unit for housing the oil pump is supported on a partition wall which separates the differential device from the torque distribution mechanism.

With the arrangement of the first feature, since the pump unit for housing the oil pump is supported on the partition wall that separates the differential device from the torque distribution mechanism, the oil pump can be easily supported.

According to a third feature of the present invention, in addition to the second feature, a hydraulic control circuit for the torque distribution mechanism is incorporated in the pump unit.

With the arrangement of the third feature, since the hydraulic control circuit for the torque distribution mechanism is incorporated in the pump unit, an oil passage between the oil pump and the hydraulic control circuit can be easily configured, and the length of oil passage can be reduced.

According to a fourth feature of the present invention, in addition to the second or third feature, the pump unit is arranged on the torque distribution mechanism side with respect to the partition wall.

With the arrangement of the fourth feature, since the pump unit is arranged on the torque distribution mechanism side with respect to the partition wall, the oil passage extending between the oil pump provided in the pump unit and the torque distribution mechanism can be simplified.

According to a fifth feature of the present invention, in addition to any of the second to fourth features, the oil pump is connected to the differential case by a rotating shaft passing through the partition wall via a seal member.

With the arrangement of the fifth feature, since the oil pump is connected to the differential case by a rotating shaft passing through the partition wall via a seal member, the oil of the differential device and the oil of the torque distribution mechanism can be prevented from being mixed with each other through the surroundings of the rotating shaft, while the rotation of the differential case located on one side of the partition wall can be transmitted to the oil pump located on the other side of the partition wall.

According to a sixth feature of the present invention, in addition to the fifth features, the seal member comprises a first seal member for inhibiting oil leakage from the differential device side, and a second seal member for inhibiting oil leakage from the torque distribution mechanism side; and a space between the first and second seal members is allowed to communicate with the atmosphere.

With the arrangement of the sixth feature, the seal member for sealing the outer periphery of the rotating shaft comprises a first seal member for inhibiting oil leakage from the differential device side, and a second seal member for inhibiting oil leakage from the torque distribution mechanism side; and a space between the first and second seal members is allowed to communicate with the atmosphere. Therefore, even if the sealing function of the first and second seal members is impaired, there is no fear of mixing up the oil of the differential device and the oil of the torque distribution mechanism.

According to a seventh feature of the present invention, in addition to the second features, the differential device and the torque distribution mechanism are housed in a common housing.

With the arrangement of the seventh feature, since the differential device and the torque distribution mechanism are housed in a common housing, the differential device and the torque distribution mechanism can be incorporated into a sub-assembly and thus assembled at the same time to the system. Therefore, the number of assembling steps can be reduced as compared with the case where the differential device and the torque distribution mechanism are separately assembled to the system.

An engine E of embodiments corresponds to the driving source of the present invention.

The above-mentioned object, other objects, characteristics, and advantages of the present invention will become apparent from preferred embodiments, which will be described in detail below by reference to the attached drawings.

DESCRIPTION OF THE PREFERRED EMBODIMENTS

Figure 1:
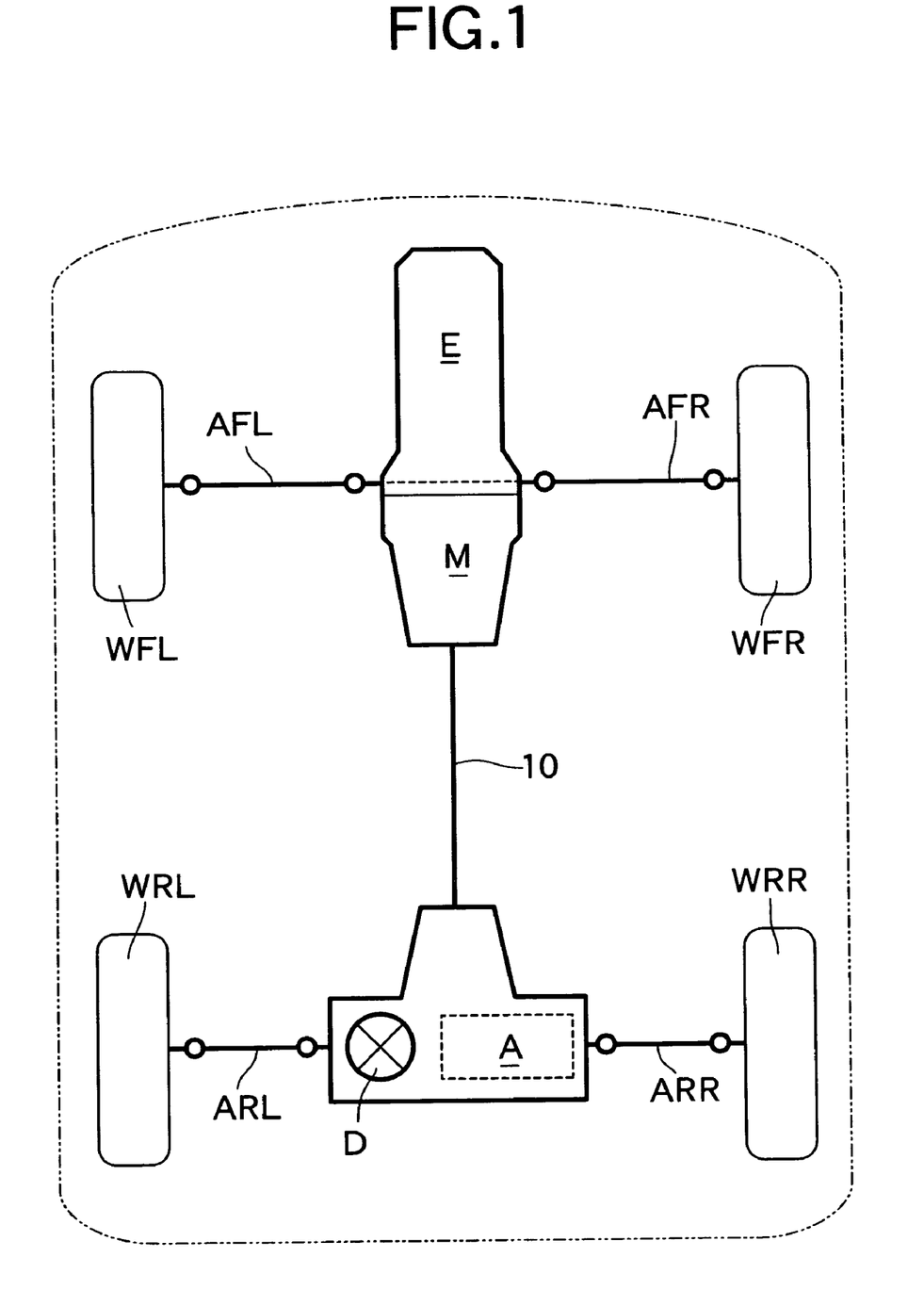
FIG. 1 is a view showing a general configuration of a front-engine rear-rive vehicle in accordance with a first embodiment.

As shown in FIG. 1, a front-engine rear-drive vehicle includes left and right front wheels WFL and WFR which are follower wheels, and left and right rear wheels WRL and WRR which are driving wheels. A transmission M is connected to the rear end of an engine E mounted in the longitudinal direction in a front part of a vehicle body. A torque distribution mechanism A integral with a differential device D is arranged at the rear end of a propeller shaft 10 extending rearward from the transmission M. A left rear wheel WRL and a right rear wheel WRR are connected respectively to a left axle ARL and a right axle ARR extending leftward and rightward from the left end and right ends of the differential device D and the torque distribution mechanism A.

Figure 2:
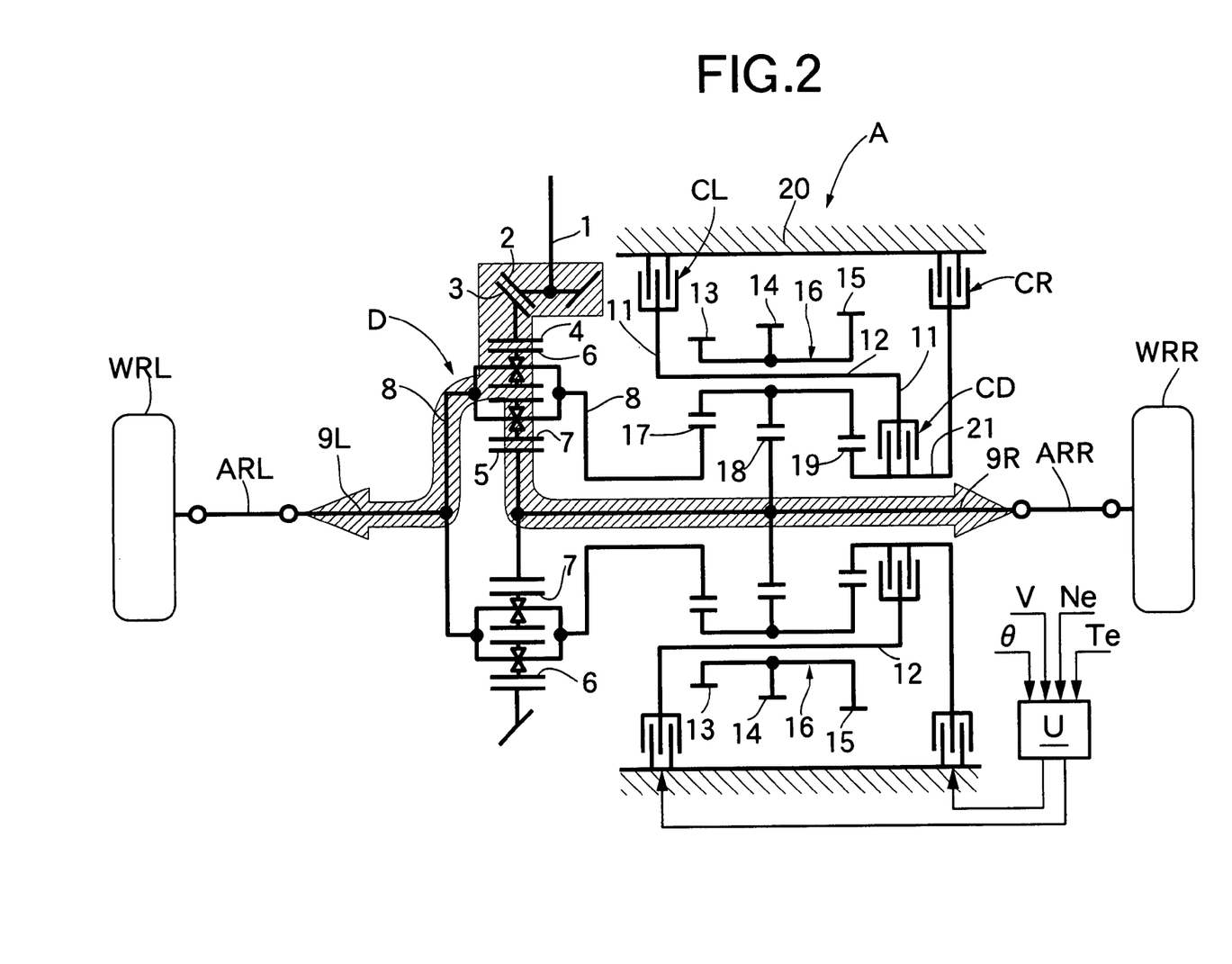
FIG. 2 is a skeleton diagram of a driving force distribution system.

As shown in FIG. 2, the differential device D is integrally provided on the torque distribution mechanism A. A driving force is transmitted to the differential device D from a driven bevel gear 3 meshing with a driving bevel gear 2 which is provided on an input shaft 1 connected to the propeller shaft 10. The differential device D is a planetary gear mechanism of a double pinion type, and comprises: a ring gear 4 formed integrally with the driven bevel gear 3; a sun gear 5 disposed coaxially within the ring gear 4; and a planetary carrier 8 supporting an outer planetary gear 6 meshing with the ring gear 4 and an inner planetary gear 7 meshing with the sun gear 5 in a state in which they are meshed with each other. In the differential device D, the ring gear 4 functions as an input element, the sun gear 5 functions as one output element and is connected to the right rear wheel WRR via a right output shaft 9R and the right axle ARR, and the planetary carrier 8 functions as the other output element and is connected to the left rear wheel WRL via a left output shaft 9L and the left axle ARL.

The torque distribution mechanism A for distributing the driving force between the left and right rear wheels WRL and WRR comprises a planetary gear mechanism. A carrier member 11 of the torque distribution mechanism A is rotatably supported on the outer periphery of the right output shaft 9R. A triple pinion member 16 integrally forming a first pinion 13, a second pinion 14 and a third pinion 15 which are rotatably supported respectively on four pinion shafts 12 arranged at 90° intervals in the circumferential direction, is also rotatably supported on the outer periphery of the right output shaft 9R.

A first sun gear 17, which is rotatably supported on the outer periphery of the right output shaft 9R to be meshed with the first pinion 13, is connected to the planetary carrier 8 of the differential device D. Also, a second sun gear 18 fixed to the outer periphery of the right output shaft 9R meshes with the second pinion 14. Further, a third sun gear 19 rotatably supported on the outer periphery of the right output shaft 9R meshes with the third pinion 15.

The numbers of teeth of the first pinion 13, the second pinion 14, the third pinion 15, the first sun gear 17, the second sun gear 18, and the third sun gear 19 are as described below.

The number of teeth of the first pinion 13, $Zb=16$
The number of teeth of the second pinion 14, $Zd=16$
The number of teeth of the third pinion 15, $Zf=32$
The number of teeth of the first sun gear 17, $Za=30$
The number of teeth of the second sun gear 18, $Zc=26$
The number of teeth of the third sun gear 19, $Ze=28$ The third sun gear 19 can be connected to a housing 20 of the torque distribution mechanism A via a sleeve 21 fitting to the outer periphery of the right output shaft 9R and a right clutch CR, and the rotational speed of the carrier member 11 is increased by the engagement of the right clutch CR. Also, the carrier member 11 can be connected to the housing 20 via a left clutch CL, and the rotational speed of the carrier member 11 is decreased by the engagement of the left clutch CL.

Also, a differential limitation clutch CD is disposed between the carrier member 11 of the torque distribution mechanism A and the sleeve 21 of the third sun gear 19. When the differential limitation clutch CD is engaged and the carrier member 11 and the third gear 19 are integrated so as to be incapable of being relatively rotated, the torque distribution mechanism A comprising the planetary gear mechanism is locked.

An electronic control unit U arithmetically processes an engine torque Te, an engine rotational speed Ne, a vehicle speed V and a steering angle θ in accordance with a predetermined program, and controls the operations of the left clutch CL, the right clutch CR, and the differential limitation clutch CD.

Next, the constructions of the differential device D and the torque distribution mechanism A are described in more detail with reference to FIG. 3.

The housing 20 of the differential device D and the torque distribution mechanism A is formed by combining a center housing 32, a left housing 33, a right housing 34, and a front housing 35. The differential device D is housed in a left half portion of the center housing 32 and in the left housing 33, and the torque distribution mechanism A is housed in a right half portion of the center housing 32 and in the right housing 34.

More specifically, in the center housing 32, a partition wall 32a extending toward the outer periphery of the right axle 9R is formed, the differential device D is housed on the left side of the partition wall 32a, and the torque distribution mechanism A is housed on the right side of the partition wall 32a.

A differential case 36 forming the outer hull of the differential device D comprises a first case 37 and a second case 38 which are connected to each other. The first case 37 is rotatably supported in the left housing 33 via a roller bearing 39. The second case 38 is rotatably supported on the partition wall 32a of the center housing 32 via a roller bearing 40. The input shaft 1 is supported on the front housing 35 via a roller bearing 41, and the driving bevel gear 2 formed integrally at the rear end of the input shaft 1 meshes with the driven bevel gear 3 formed integrally with the first case 37 of the differential case 36. Therefore, the output of the transmission M is transmitted from the propeller shaft 10 (see FIG. 1) to the differential case 36 of the differential device D via the input shaft 1.

Figure 3:
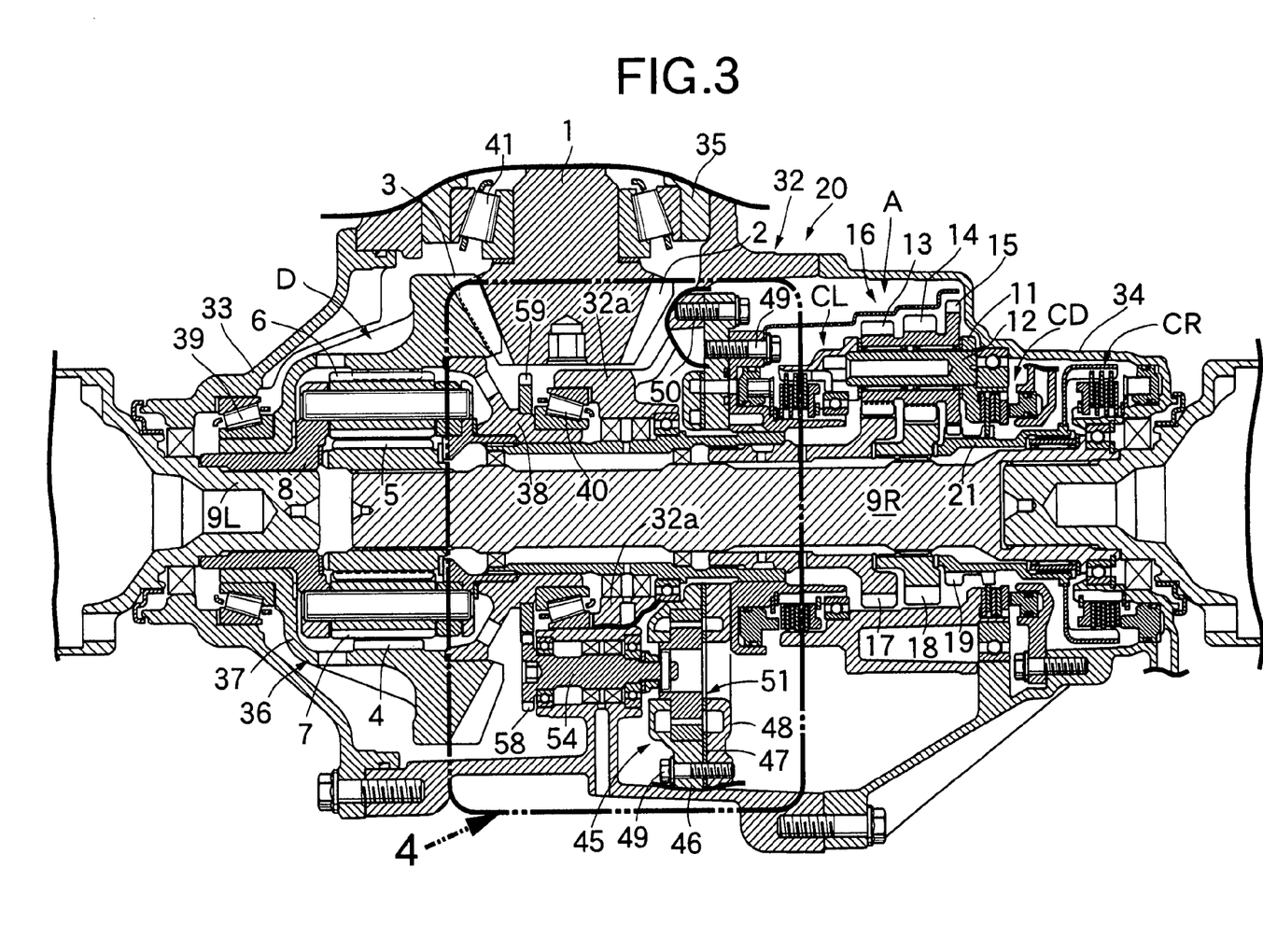
FIG. 3 is a view showing a construction of the driving force distribution system.
Figure 4:
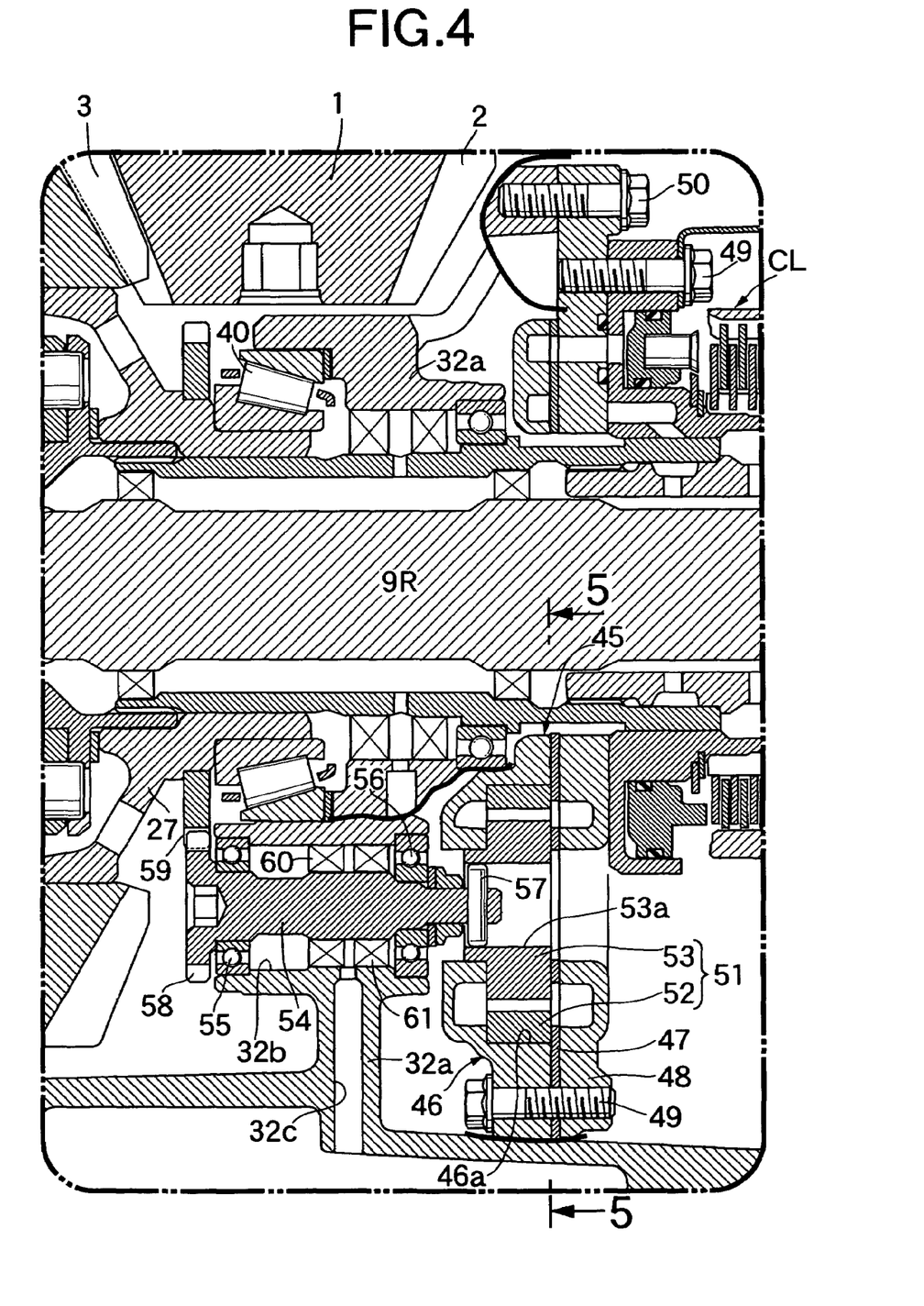
FIG. 4 is an enlarged view of portion 4 in FIG. 3.

As is apparent from FIGS. 3 and 4, a pump unit 45 for supplying working oil to the torque distribution mechanism A is formed by superposing a first pump body 46, a separator plate 47 and a second pump body 48, and integrally connecting them with bolts 49. This pump unit 45 is fixed by bolts 50 on the right side surface of the partition wall 32a of the center housing 32.

A trochoid oil pump 51 housed in a pump chamber 46a formed in the first pump body 46 comprises an outer rotor 52 and an inner rotor 53 arranged on the inner periphery of the outer rotor 52. A rotating shaft 54 for driving the inner rotor 53 extends to the differential device D side through a through hole 32b in the partition wall 32a. Specifically, the rotating shaft 54 is supported in the through hole 32b formed in the partition wall 32a via a pair of ball bearings 55 and 56. A drive pin 57 is provided at the tip end of the rotating shaft 54 projecting rightward from the partition wall 32a, and engages with a groove 53a formed in the inner rotor 53. A follower gear 58 is provided at the tip end of the rotating shaft 54 projecting leftward from the partition wall 32a, and meshes with a driving gear 59 fixed to the second case 38 of the differential case 36. Therefore, the rotation of the differential case 36 is transmitted to the inner rotor 53 via the driving gear 59, the follower gear 58, the rotating shaft 54 and the drive pin 57, so that the oil pump 51 is operated by the cooperation with the outer rotor 52 rotated by being meshed with the inner rotor 53.

First and second seal members 60 and 61 are provided between the through hole 32b and the intermediate portion of the rotating shaft 54. The first seal member 60 is mounted so as to hinder oil leakage from the differential device D side to the torque distribution mechanism A side. The second seal member 61 is mounted so as to hinder oil leakage from the torque distribution mechanism A side to the differential device D side. A space between the first and second seal members 60 and 61 communicates with the atmosphere via a communication hole 32c formed in the partition wall 32a.

Figure 5:
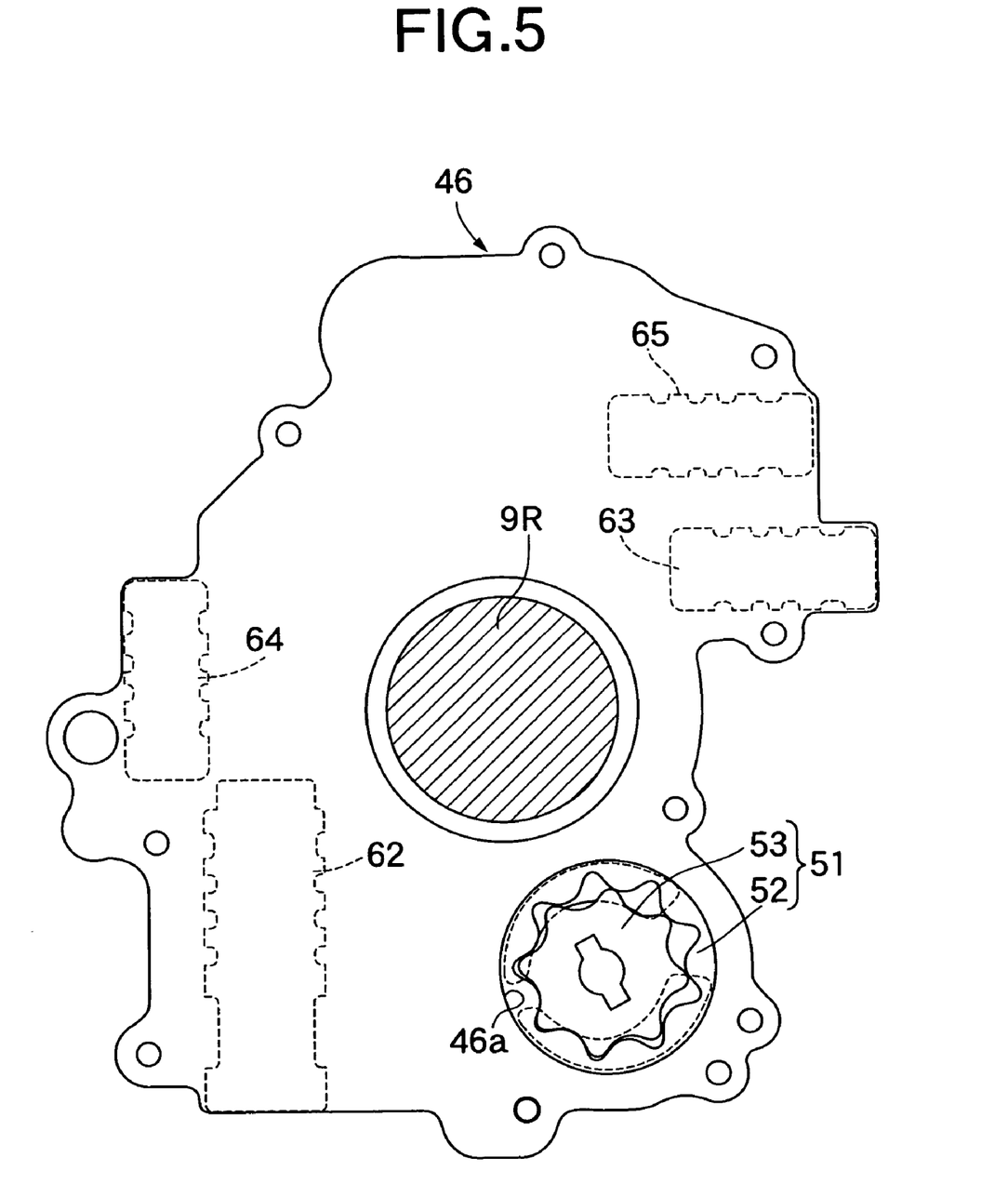
FIG. 5 is a view taken in the direction of the arrows 5 in FIG. 4.

FIG. 5 shows a mating surface with the separator plate 47 of the first pump body 46, inside which a regulator valve 62, a left clutch valve 63, a right clutch valve 65, and a differential limitation clutch valve 64 are housed.

FIGS. 6 to 9 show a hydraulic control circuit formed in the pump unit 45 of the torque distribution mechanism A.

The pressure of oil sucked up through an oil filter 44 by the oil pump 51 is regulated to a regulator pressure (black portion) by a regulator valve 62, and the oil is supplied to a linear solenoid valve 66, a shift solenoid valve 67 of the left clutch valve 63, a shift solenoid valve 69 of the right clutch valve 65, and a shift solenoid valve 68 of the differential limitation clutch valve 64. The linear solenoid valve 66 regulates the regulator pressure to a clutch pressure (dark gray portion), and the oil is supplied to the left clutch valve 63, the right clutch valve 65, and the differential limitation clutch valve 64. An excess oil in the regulator valve 62 is supplied to lubricate portions to be lubricated (for example, the right axle 9R) as a lubricating oil (light dark portion).

Figure 6:
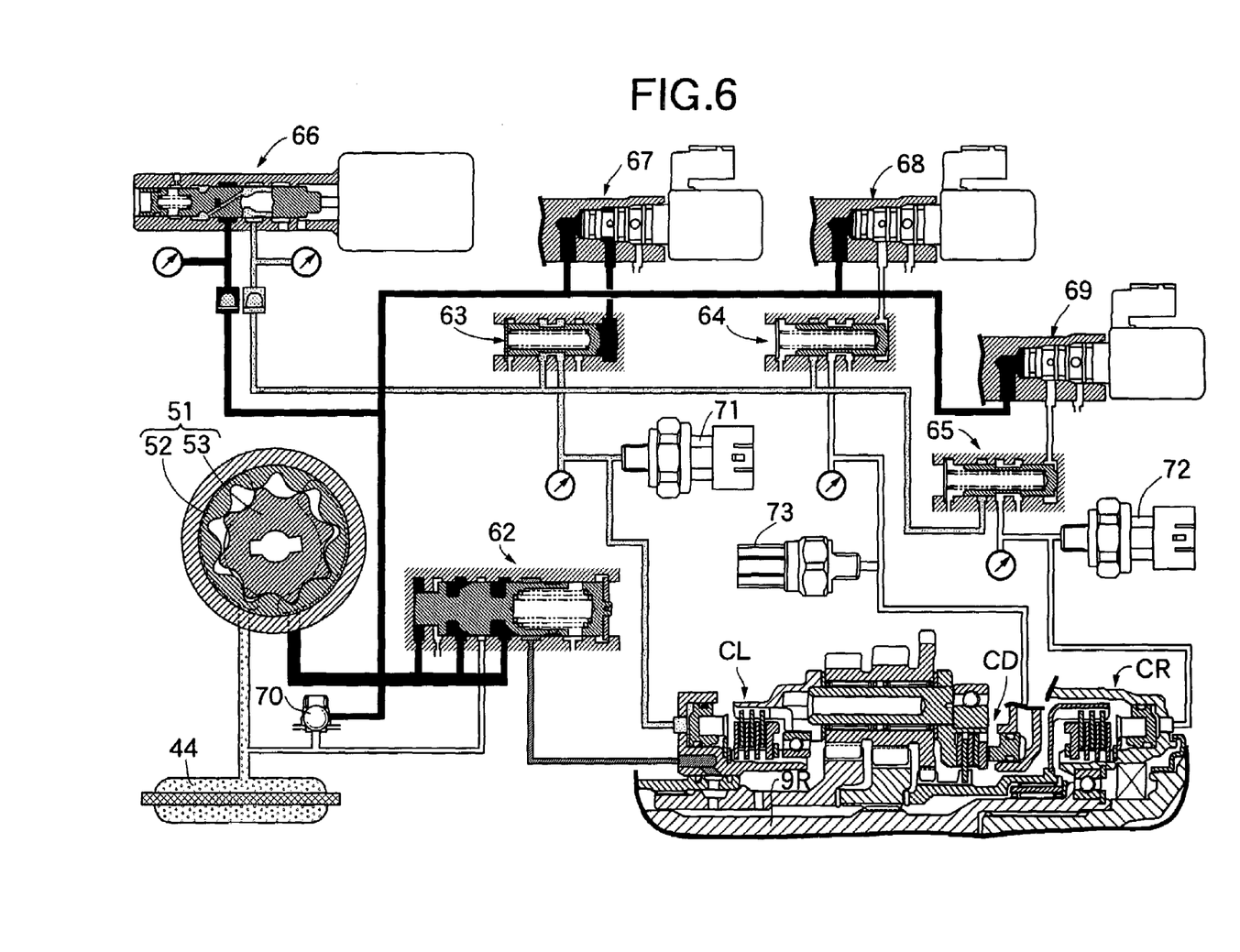
FIG. 6 is a hydraulic control circuit diagram of the driving force distribution system (at the time of turning left).
Figure 7:
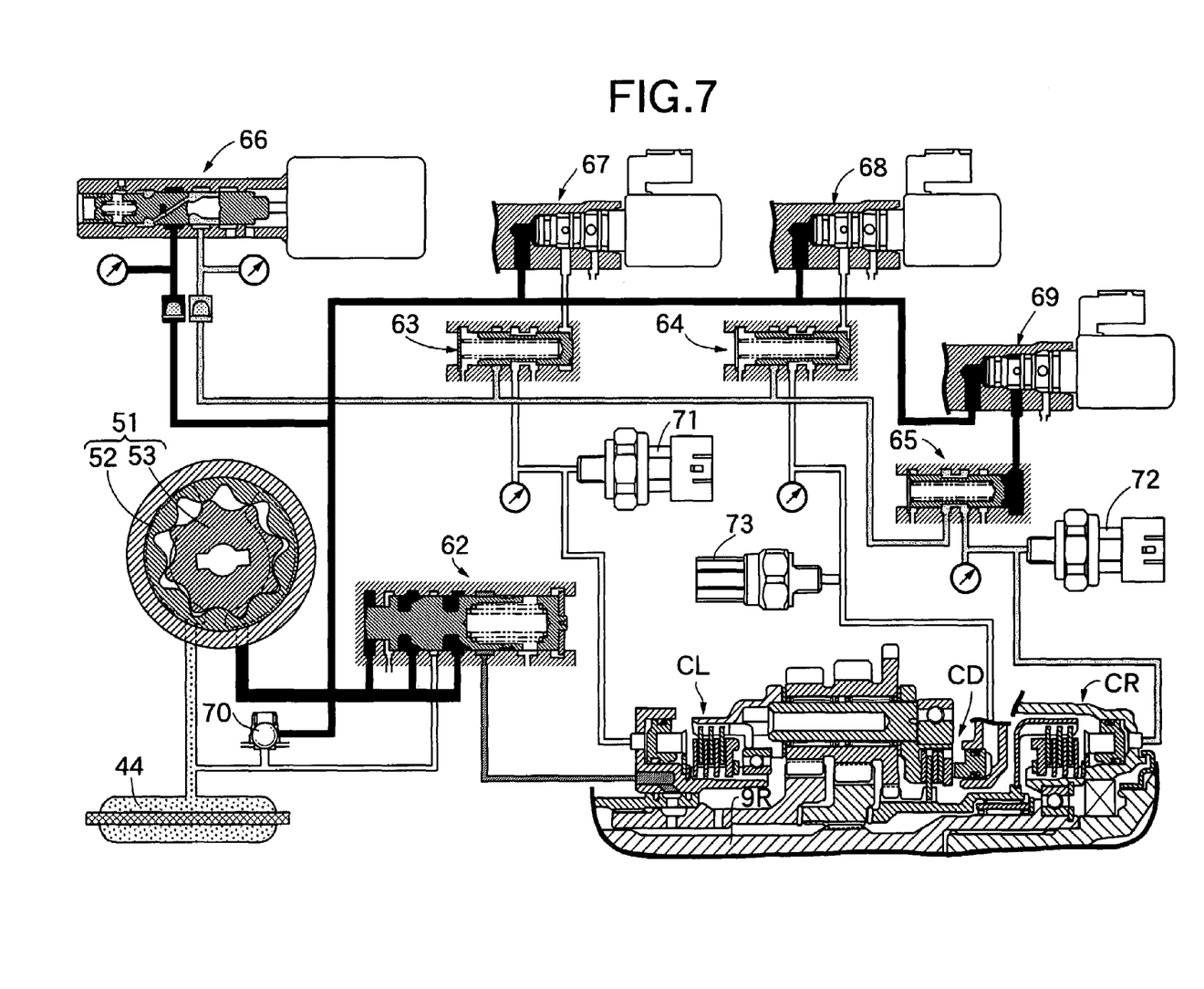
FIG. 7 is a hydraulic control circuit diagram of the driving force distribution system (at the time of turning right).
Figure 8:
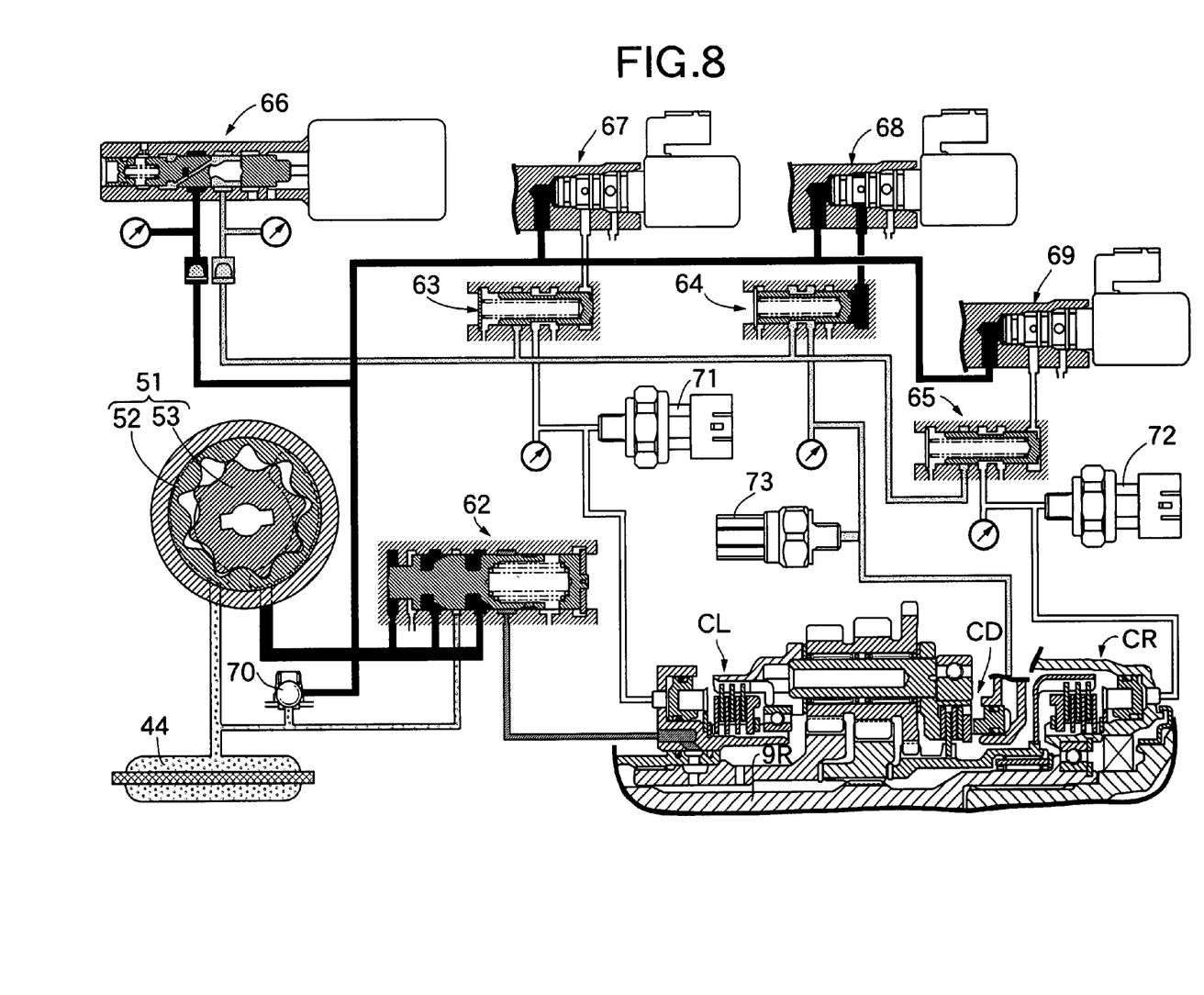
FIG. 8 is a hydraulic control circuit diagram of the driving force distribution system (at the time of differential limitation).
Figure 9:
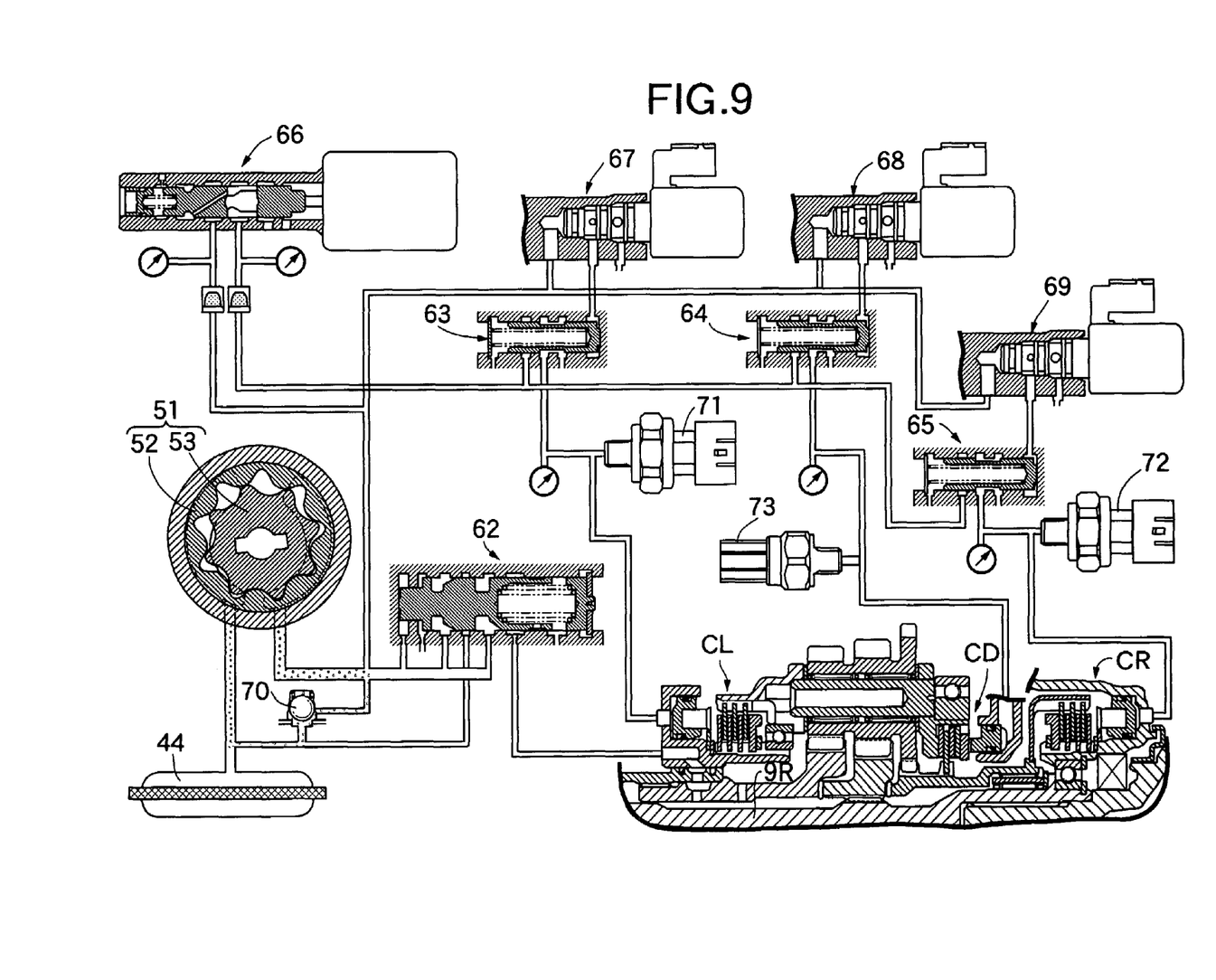
FIG. 9 is a hydraulic control circuit diagram of the driving force distribution system (at the time of traveling rearward).

As shown in FIG. 6, if the shift solenoid valve 67 is turned on by a command from the electronic control unit U when the vehicle is turned to the left, the regulator pressure acts on the left clutch valve 63 to open the valve 63, so that the clutch pressure is supplied to the working chamber of the left clutch CL, and hence the left clutch CL is engaged. As shown in FIG. 7, if the shift solenoid valve 69 is turned on by a command from the electronic control unit U when the vehicle is turned to the right, the regulator pressure acts on the right clutch valve 65 to open the valve 65, so that the clutch pressure is supplied to the working chamber of the right clutch CR, and hence the right clutch CR is engaged. As shown in FIG. 8, if the shift solenoid valve 68 is turned on by a command from the electronic control unit U at the time of differential limitation, the regulator pressure acts on the differential limitation clutch valve 64 to open the valve 64, so that the clutch pressure is supplied to the working chamber of the differential limitation clutch CD, and hence the differential limitation clutch CD is engaged. As shown in FIG. 9, if the oil pump 51 is rotated in the reverse direction when the vehicle travels rearward, a check valve 70 is opened, whereby the oil pump 51 runs idle in a no-load condition.

When the left clutch CL, the right clutch CR, or the differential limitation clutch CD is engaged as described above, the clutch pressure is detected by a left clutch pressure sensor 71, a right clutch pressure sensor 72, or a differential limitation clutch pressure sensor 73, and the detection is fed back to the electronic control unit U.

Figure 10:
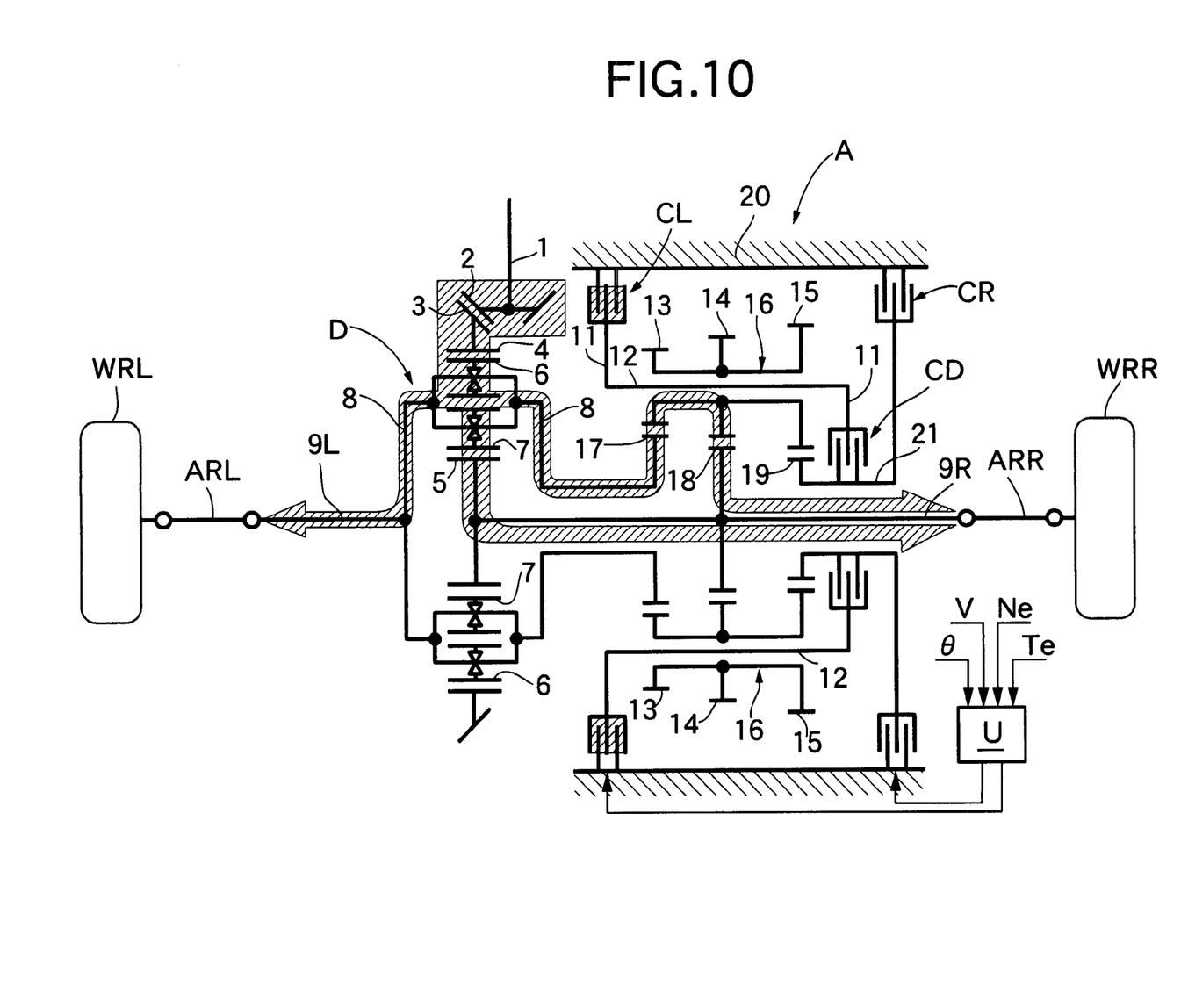
FIG. 10 is a diagram showing an operation of the driving force distribution system at the time of turning left in a medium or low vehicle speed region.

According to the torque distribution mechanism A configured as described above, when the vehicle is turned to the left in the medium or low vehicle speed region as shown in FIG. 10, the left clutch CL is engaged by a command from the electronic control unit U, whereby the carrier member 11 is connected to the housing 20 and hence the rotation is stopped. At this time, since the right output shaft 9R integral with the right rear wheel WRR and the left output shaft 9L integral with the left rear wheel WRL (namely, the planetary carrier 8 of the differential device D) are connected to each other via the second sun gear 18, the second pinion 14, the first pinion 13 and the first sun gear 17, the rotational speed NR of the right rear wheel WRR is increased with respect to the rotational speed NL of the left rear wheel WRL, according to the following equation:

$$NR/NL = (Zd/Zc) \times (Za/Zb) = 1.154 \quad (1)$$

If the rotational speed NR of the right rear wheel WRR is increased with respect to the rotational speed NL of the left rear wheel WRL as described above, a part of torque of the left rear wheel WRL, which is a turning inner wheel, is transmitted to the right rear wheel WRR, which is a turning outer wheel, as indicated by the hatched arrow mark in FIG. 10, thereby assisting the left turn of vehicle to improve the turning performance.

If the rotational speed of the carrier member 11 is decreased by appropriately regulating the engagement force of the left clutch CL instead of stopping the carrier member 11 by using the left clutch CL, the rotational speed NR of the right rear wheel WRR is increased with respect to the rotational speed NL of the left rear wheel WRL corresponding to the decrease in speed, and an arbitrary torque can be transmitted from the left rear wheel WRL which is a turning inner wheel to the right rear wheel WRR which is a turning outer wheel.

Figure 11:
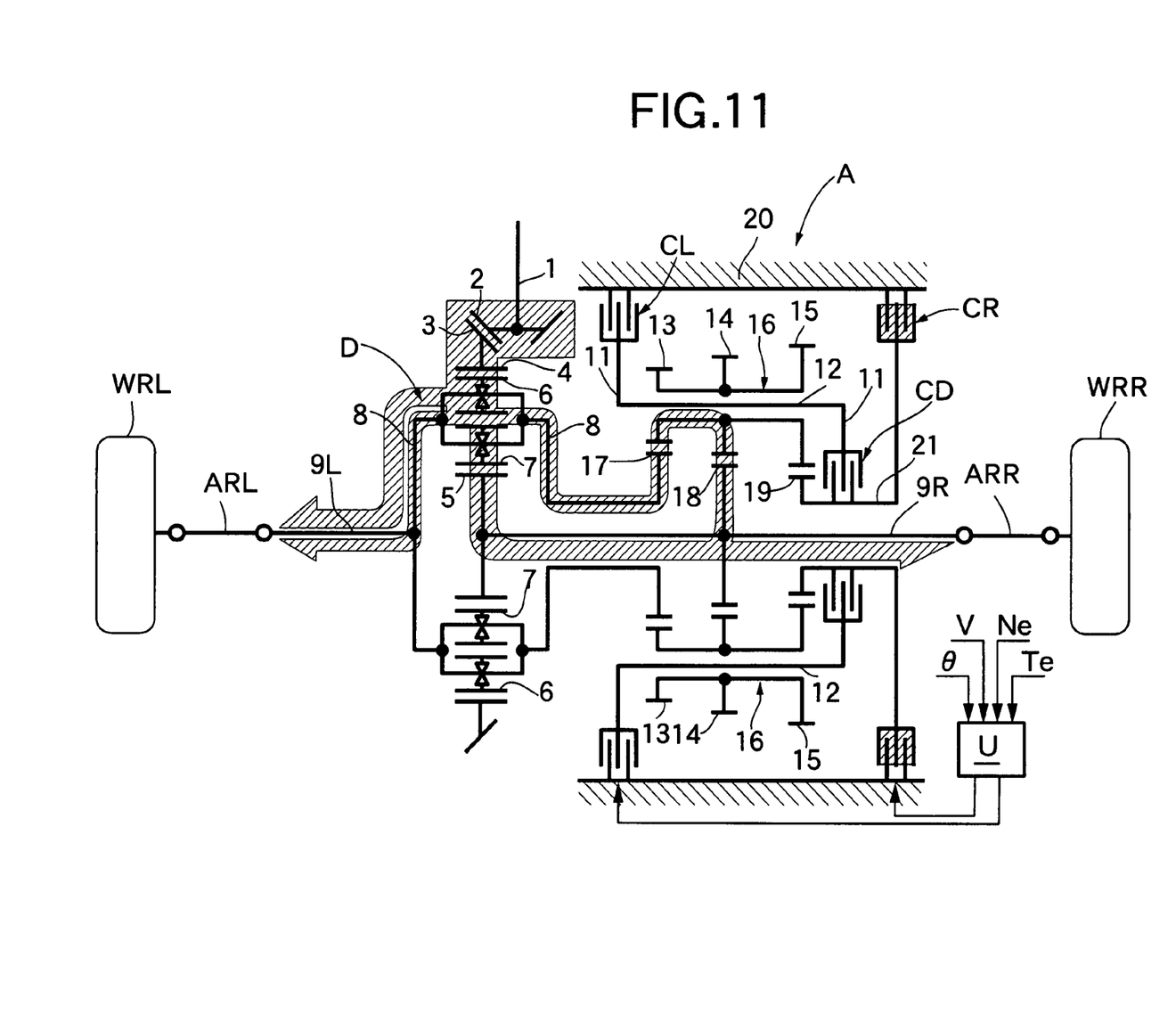
FIG. 11 is a diagram showing an operation of the driving force distribution system at the time of turning right in the medium or low vehicle speed region.

On the other hand, as shown in FIG. 11, when the vehicle is turned to the right in a medium or low vehicle speed region, the sleeve 21 is connected to the housing 20 by engaging the right clutch CR at a command from the electronic control unit U, whereby the rotation is stopped. As a result, the third pinion 15 connected to the sleeve 21 via the third sun gear 19 is revolved and rotated, the rotational speed of the carrier member 11 is increased with respect to the rotational speed of the right output shaft 9R, and the rotational speed NL of the left rear wheel WRL is increased with respect to the rotational speed NR of the right rear wheel WRR, according to the following equation:

$$NL/NR = \{1-(Ze/Zf)\times(Zb/Za)\} \div \{1-(Ze/Zf)\times(Zd/Zc)\} = 1.156 \qquad (2)$$

If the rotational speed NL of the left rear wheel WRL is increased with respect to the rotational speed NR of the right rear wheel WRR as described above, a part of torque of the right rear wheel WRR, which is a turning inner wheel, can be transmitted to the left rear wheel WRL, which is a turning outer wheel, as indicated by the hatched arrow mark in FIG. 11. Also in this case, if the rotational speed of the carrier member 11 is increased by appropriately regulating the engagement force of the right clutch CR, the rotational speed NL of the left rear wheel WRL is increased with respect to the rotational speed NR of the right rear wheel WRR corresponding to the decrease in speed, and an arbitrary torque is transmitted from the right rear wheel WRR which is a turning inner wheel to the left rear wheel WRL which is a turning outer wheel, thereby assisting the right turn of vehicle to improve the turning performance.

Also in this case, if the rotational speed of the sleeve 21 is decreased by appropriately regulating the engagement force of the right clutch CR instead of stopping the sleeve 21 by using the right clutch CR, the rotational speed NL of the left rear wheel WRL is increased with respect to the rotational speed NR of the right rear wheel WRR corresponding to the decrease in speed, and an arbitrary torque can be transmitted from the right rear wheel WRR which is a turning inner wheel to the left rear wheel WRL which is a turning outer wheel.

As is apparent from the comparison between Equation (1) and Equation (2), by setting the numbers of teeth of the first pinion 13, the second pinion 14, the third pinion 15, the first sun gear 17, the second sun gear 18, and the third sun gear 19 as described above, the speed increasing ratio (about 1.154) from the left rear wheel WRL to the right rear wheel WRR can be made approximately equal to the speed increasing ratio (about 1.156) from the right rear wheel WRR to the left rear wheel WRL.

Also, in the case where the vehicle runs straight at a high speed, it is preferable that the function of the differential device D be limited, and the right and left wheels be rotated substantially integrally. In this case, if the differential limitation clutch CD is engaged by a command from the electronic control unit U, the carrier member 11 and the third sun gear 19 of the torque distribution mechanism A are connected integrally to each other, so that the planetary gear mechanism enters a locked state. Thus, the left axle ARL connected to the first sun gear 17 and the right axle ARR connected to the second sun gear 18 are integrated so as to be incapable of being relatively rotated, whereby the differential limitation function is exerted.

In such a case where one of the right and left wheels slips because of a condition of road surface and the rotation of the other wheel stops, if the oil pump is connected to the axle on the side on which the rotation stops, the oil pump stops and the torque distribution mechanism A becomes incapable of being operated. According to this embodiment, however, even in the case where one of the right and left wheels stops, the oil pump 51 is driven by the rotation of the differential case 36 which constantly rotates. Therefore, it is possible to reliably prevent a situation where the oil pump 51 does not produce a hydraulic pressure and the torque distribution mechanism A becomes incapable of being operated.

Since the pump unit 45 is supported on the partition wall 32a that separates the differential device D from the torque distribution mechanism A, the oil pump 51 can be easily supported. Also, since the hydraulic control circuit for the torque distribution mechanism A is incorporated in the pump unit 45, an oil passage between the oil pump 51 and the hydraulic control circuit can be easily formed, and further the length of oil passage can be reduced. Furthermore, since the pump unit 45 is arranged on the torque distribution mechanism A side with respect to the partition wall 32a, it is possible to simplify the oil passage leading from the oil pump 51 of the pump unit 45 to the torque distribution mechanism A.

Since the differential case 36 and the oil pump 51 are connected to each other by the rotating shaft 54 passing through the partition wall 32a via the first and second seal members 60 and 61, the oil of the differential device D and the oil of the torque distribution mechanism A can be prevented from being mixed with each other through the surroundings of the rotating shaft 54, while the rotation of the differential case 36 located on the left side of the partition wall 32a can be transmitted to the oil pump 51 located on the right side of the partition wall 32a.

Moreover, the outer periphery of the rotating shaft 54 is sealed by the first seal member 60 for inhibiting oil leakage from the differential device D side and the second seal member 61 for inhibiting oil leakage from the torque distribution mechanism A side, and a space between the first and second seal members 60 and 61 is allowed to communicate with the atmosphere by the communication hole 32c. Therefore, even if the sealing function of the first and second seal members 60 and 61 is impaired, there is no fear of mixing of the oil of the differential device D and the oil of the torque distribution mechanism A.

Figure 12:
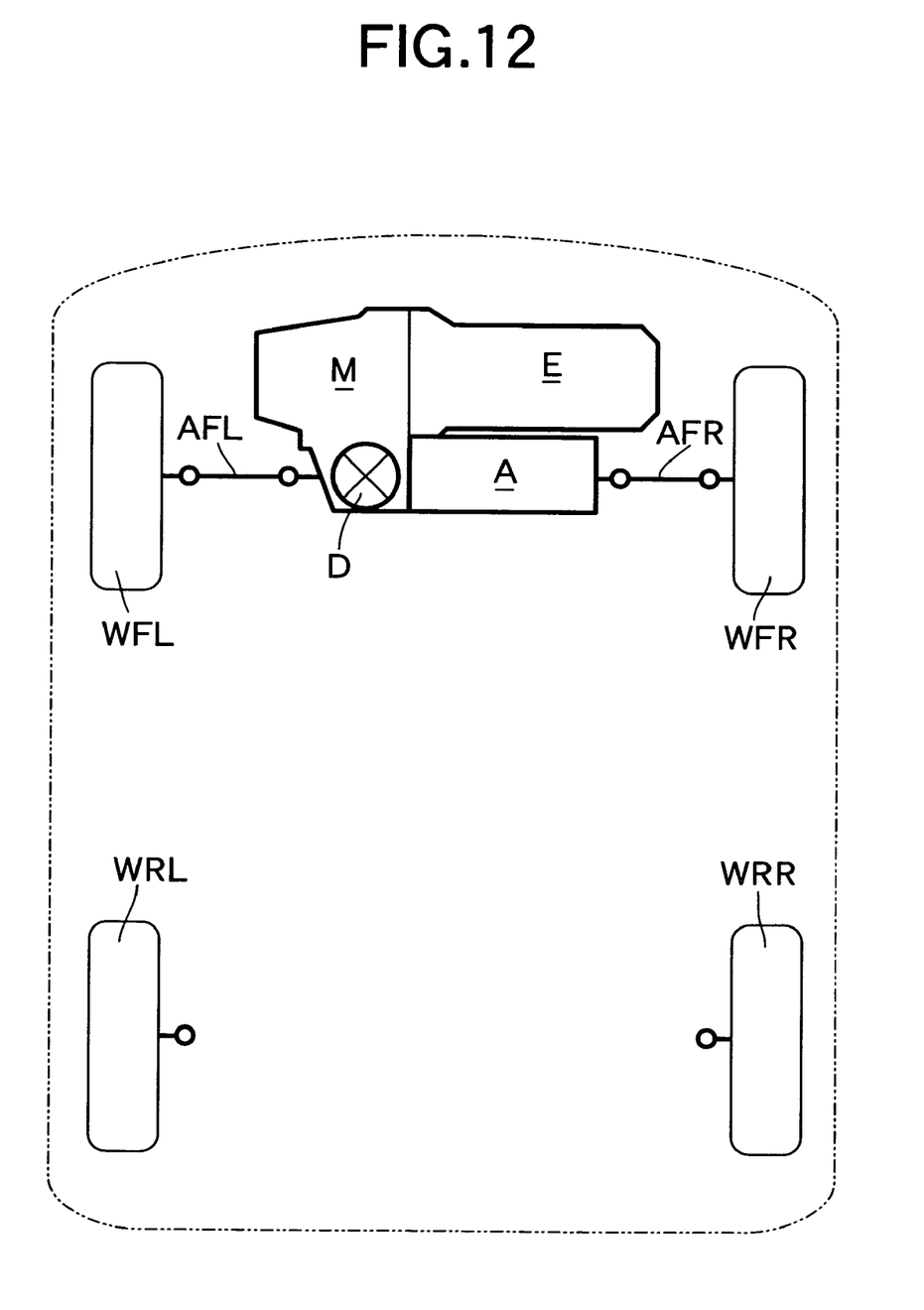
FIG. 12 is a view showing a general configuration of a front-engine front-drive vehicle in accordance with a second embodiment.

FIG. 12 shows a second embodiment of the present invention. In the first embodiment, the torque distribution mechanism A is arranged on the rear wheels WRL and WRR side of the front-engine rear-drive vehicle. However, in the second embodiment, the differential device D and the torque distribution mechanism A are arranged between an axle AFL of the front wheel WFL and an axle AFR of the front wheel WFR of a front-engine front-drive vehicle. The construction and function of the torque distribution mechanism A are the same as those of the first embodiment, and the same operation and function as those of the first embodiment can be achieved.

The present invention has been described in detail, however, various modifications in design may be made thereto without departing from the subject matter of the invention.

For example, the construction of the differential device D and the construction of the torque distribution mechanism A are not limited to the above-described embodiments.

What is claimed is:

1. A vehicular driving force distribution system comprising:
   a differential device to which torque is supplied from a driving source; and a torque distribution mechanism for distributing the torque supplied to the differential device between left and right wheels in an arbitrary ratio, wherein an oil pump is provided to produce a hydraulic pressure for operating the torque distribution mechanism, a rotation transmitting member is provided on a differential case of the differential device for transmitting rotation of the differential case, a rotation receiving member for receiving the rotation transmitted by the rotation transmitting member is provided on a rotating shaft for the oil pump, and the oil pump is driven by the rotation of the differential case of the differential device.

2. The vehicular driving force distribution system according to claim 1, wherein a pump unit for housing the oil pump is supported on a partition wall which is provided between and separates the differential device from the torque distribution mechanism.

3. The vehicular driving force distribution system according to claim 2, wherein a hydraulic control circuit for the torque distribution mechanism is incorporated in the pump unit.

4. The vehicular driving force distribution system according to claim 2 or 3, wherein the pump unit is arranged on the torque distribution mechanism side with respect to the partition wall.

5. The vehicular driving force distribution system according to claim 2 or 3, wherein the oil pump is connected to the differential case by the rotating shaft passing through the partition wall via a seal member.

6. The vehicular driving force distribution system according to claim 2, wherein the differential device and the torque distribution mechanism are housed in a common housing.

7. A vehicular driving force distribution system, comprising:
- a differential device to which torque is supplied from a driving source; and
- a torque distribution mechanism for distributing the torque supplied to the differential device between left and right wheels in an arbitrary ratio,
- wherein an oil pump which produces a hydraulic pressure for operating the torque distribution mechanism is driven by rotation of a differential case of the differential device,
- wherein a pump unit for housing the oil pump is supported on a partition wall which separates the differential device from the torque distribution mechanism,
- wherein the oil pump is connected to the differential case by a rotating shaft passing through the partition wall via a seal member, and
- wherein the seal member comprises a first seal member for inhibiting oil leakage from the differential device side, and a second seal member for inhibiting oil leakage from the torque distribution mechanism side; and wherein a space between the first and second seal members is allowed to communicate with the atmosphere.

* * * * *